United States Patent
Lee et al.

(10) Patent No.: US 7,242,505 B2
(45) Date of Patent: Jul. 10, 2007

(54) BEAM DEFLECTOR, LIGHT SCANNING UNIT USING THE SAME, AND IMAGE FORMING APPARATUS USING THE LIGHT SCANNING UNIT

(75) Inventors: Sang-Hoon Lee, Seongnam-si (KR); Woo-Kyu Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/207,797

(22) Filed: Aug. 22, 2005

(65) Prior Publication Data

US 2006/0114537 A1    Jun. 1, 2006

(30) Foreign Application Priority Data

Dec. 1, 2004    (KR) .................. 10-2004-0099771

(51) Int. Cl.
*G02B 26/08*    (2006.01)
(52) U.S. Cl. ...................... 359/196; 359/216
(58) Field of Classification Search ........ 359/196–226, 359/507, 511, 514, 819; 347/245, 257
See application file for complete search history.

(56) References Cited

U.S. PATENT DOCUMENTS

| | | | | |
|---|---|---|---|---|
| 5,818,622 | A | * | 10/1998 | Hisa ........................... 359/216 |
| 6,195,190 | B1 | * | 2/2001 | Tachibe et al. ............. 359/216 |
| 6,317,244 | B1 | * | 11/2001 | Ishibe ......................... 359/204 |

FOREIGN PATENT DOCUMENTS

| | | |
|---|---|---|
| JP | 05-164983 | 6/1993 |
| JP | 06-230305 | 8/1994 |
| JP | 08-106039 | 4/1996 |
| JP | 09-189877 | 7/1997 |
| JP | 11-326813 | 11/1999 |
| JP | 2000-193904 | 7/2000 |

* cited by examiner

*Primary Examiner*—Euncha P. Cherry
(74) *Attorney, Agent, or Firm*—Roylance, Abrams, Berdo & Goodman, L.L.P.

(57) ABSTRACT

A beam deflector including a driving source for providing a rotation force, a beam deflection unit rotatably arranged on the driving source to deflect and scan an incident beam, and a cover member configured to cover the driving source and the beam deflection unit. The cover member has an aluminum foam layer located thereon to reduce vibration and noise occurring when the driving source and the beam deflection unit rotate.

12 Claims, 6 Drawing Sheets

BEAM DEFLECTOR, LIGHT SCANNING UNIT USING THE SAME, AND IMAGE FORMING APPARATUS USING THE LIGHT SCANNING UNIT

CROSS-REFERENCE TO RELATED PATENT APPLICATIONS

This application claims the benefit under 35 U.S.C. § 119(a) of Korean Patent Application No. 10-2004-0099771, filed on Dec. 1, 2004, the entire disclosure of which is hereby incorporated by reference.

BACKGROUND OF THE INVENTION

1. Field of the Invention

The present invention relates to a beam deflector scanning light emitted from a light source to a target surface, a light scanning unit using the same, and an image forming apparatus using the light scanning unit. More particularly, the present invention relates to a beam deflector having a structure capable of reducing noise caused by rotation of a motor, a light scanning unit using the same, and an image forming apparatus using the light scanning unit.

2. Description of the Related Art

Generally, a light scanning unit is used for devices such as a laser printer, a digital copy machine, a barcode reader, and a facsimile machine to form a latent image on a photoreceptor through main scanning of a beam deflector and sub-scanning by the rotation of the photoreceptor.

Referring to FIG. 1, a conventional light scanning unit includes a light source 1 for generating a light beam, a beam deflector 7 to deflect incident light so that the light beam emitted from the light source 1 is scanned onto a photoreceptor 15, and an f-θ lens 11 for compensating for an error in the deflected light beam from the beam deflector 7. Additionally, the conventional light scanning unit may further include a collimating lens 3 on an optical path between the light source 1 and the beam deflector 7, to collect the light beam diverging from the light source 1, and a cylindrical lens 5 for shaping the light beam. A reflecting mirror 13 may be disposed between the f-θ lens 11 and the photoreceptor 15 to change the direction of the light beam.

The beam deflector 7 includes a driving source 9 and a polygonal mirror 8 rotated by the driving source 9. Accordingly, the direction of the beam emitted from the light source 1 is changed according to the rotation of the polygonal mirror 8, and a scanning direction is determined.

With technological developments, the print speed of a device using such light scanning units has increased. Accordingly, a polygonal mirror is required to rotate at higher speeds and operate for a long period of time.

However, when the polygonal mirror is rotated at high speed, noise occurs. The noise may occur because of factors such as friction with the air and pressure differences resulting from the high-speed rotation of the polygonal mirror.

A technique relating to the reduction of noise is disclosed in Japanese Patent Publication No. P2001-142023A, entitled "Laser Scanning Unit," published on May 25, 2001.

Referring to FIG. 2, a laser scanning unit disclosed in the Japanese patent publication includes a polygonal mirror 25 rotated by a motor 21, a cover member 31 protecting the polygonal mirror 25, and radiating pins 35 installed below and partially exposed outside the motor 21.

The cover member 31 covers the polygonal mirror 25 to protect the polygonal mirror 25 from external contaminants. Moreover, the cover member 31 prevents noise, due to the driving of the motor 21, from transmitting to the outside of the laser scanning unit. In addition, the cover member 31 is made using an aluminum material having high heat conductivity to prevent heat from being generated. An aperture 31a, through which a laser beam passes, is provided on a sidewall of the cover member 31. The radiating pins 35 discharge heat, generated during the driving of the motor 21, to the outside of the laser scanning unit.

An image forming apparatus, such as a laser printer or a copy machine, uses a laser scanning unit for improving performance and minimizing size. However, when the laser scanning unit includes the radiating pins 35, the ability to minimize the image forming apparatus is limited.

Meanwhile, noise occurring in the motor 21 can be prevented from being transmitted outside through noise insulation and acoustic absorption. However, when the cover member 31 of the conventional laser scanning unit is made using an aluminum material, noise insulation may be achieved, but, efficiency is lower compared to when a material having a higher density than an aluminum material is used. Moreover, since the cover member 31 made using an aluminum material does not have acoustic absorption properties, it is very likely that noise occurring in the motor 21 will vibrate in the internal space of the cover member 31, thus, resulting in resonance.

Accordingly, there is a need for an improved beam deflector configured to reduce noise caused by rotation of a motor.

SUMMARY OF THE INVENTION

An aspect of the present invention is to solve at least the above problems and/or disadvantages and to provide at least the advantages described below. Accordingly, an aspect of the present invention is to provide a minized beam deflector which suppresses internal vibration and noise through noise insulation and acoustic absorption, a light scanning unit using the same, and an image forming apparatus using the light scanning unit.

According to an aspect of the present invention, there is provided a beam deflector including a driving source providing a rotation force. A beam deflection unit is rotatably arranged on the driving source to deflect and scan an incident beam. A cover member is configured to cover the driving source and the beam deflection unit. The cover member includes an aluminum foam layer located thereon to reduce vibration and noise when the driving source and the beam deflection unit rotate.

According to another aspect of the present invention, there is provided a light scanning unit including a light source. A beam deflection unit is rotatably arranged on the driving source to deflect and scan an incident beam. A cover member is configured to cover the driving source and the beam deflection unit. The cover member includes an aluminum foam layer located thereon to reduce vibration and noise when the driving source and the beam deflection unit rotate. An f-θ lens is also provided for compensating a beam deflected by the beam deflector at different magnifications in a main scanning direction and a sub-scanning direction, respectively, and forming an image on a photoreceptor.

According to still another aspect of the present invention, there is provided an image forming apparatus includes a developing unit having a photoreceptor. A light source is also provided. A beam deflection unit is rotatably arranged on the driving source to deflect and scan an incident beam.

A cover member is configured to cover the driving source and the beam deflection unit. The cover member includes an aluminum foam layer located thereon to reduce vibration and noise when the driving source and the beam deflection unit rotate. Additonally, an f-θ lens is provided for compensating a beam deflected by the beam deflector at different magnifications in a main scanning direction and a sub-scanning direction, respectively, and forming an image on a photoreceptor. A transfer unit is positioned so that an image formed at the developing unit can be transferred to a printing medium. A fusing unit fuses the image transferred onto the printing medium.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the exemplary embodiments of the invention. Also, descriptions of well-known functions and constructions are omitted for clarity and conciseness.

Figure 1:
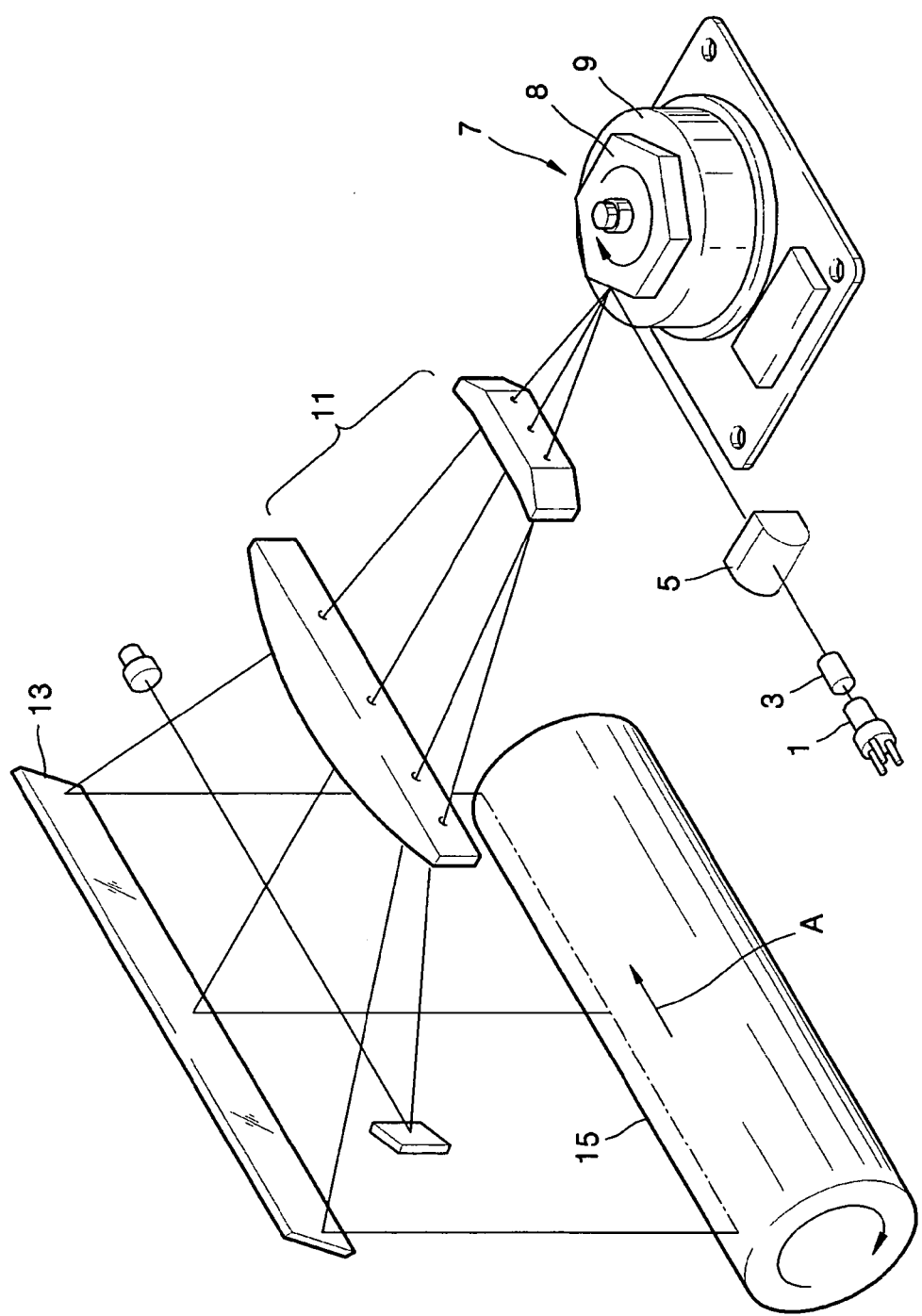
FIG. 1 is a schematic perspective view of an optical arrangement of a typical light scanning unit.
Figure 2:
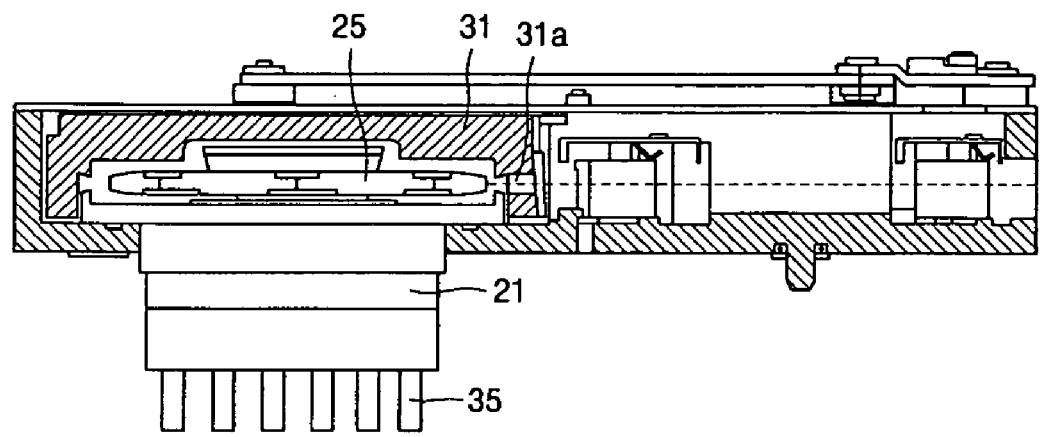
FIG. 2 is a partial sectional view of a conventional light scanning unit.
Figure 3:
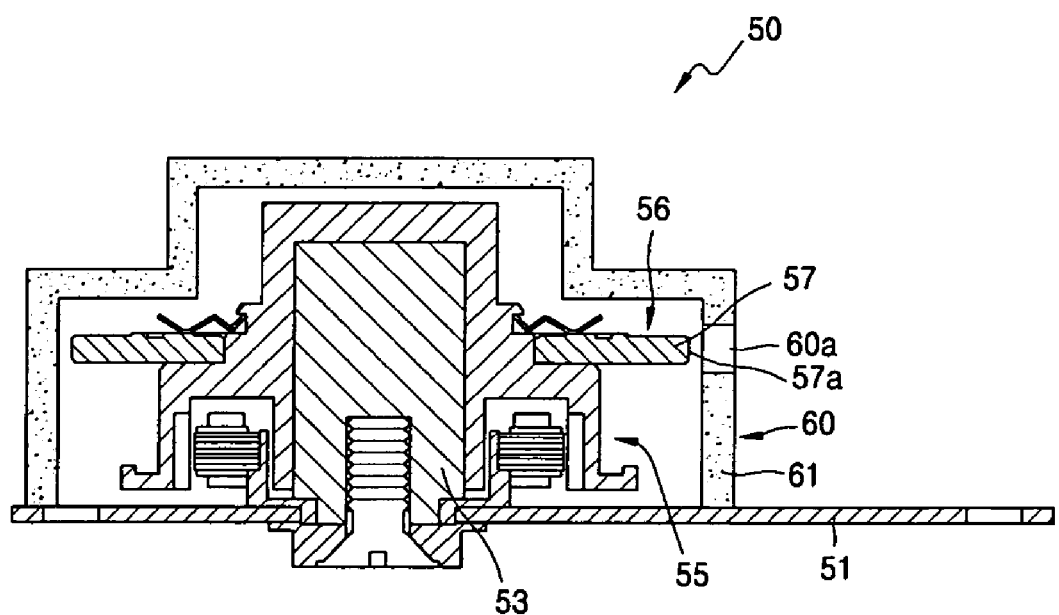
FIG. 3 is a sectional view of a beam deflector in accordance with an embodiment of the present invention.

Referring to FIG. 3, a beam deflector 50 in accordance with an embodiment of the present invention includes a driving source 55, a beam deflection unit 56 to deflect an incident beam, and a cover member 60 for covering the driving source 55 and the beam deflection unit 56.

The driving source 55 is arranged on a base 51 and provides a rotational force, induced by an electromagnetic force, to the beam deflection unit 56. The beam deflection unit 56 is rotatably arranged on a shaft 53 and is rotated by the rotation force provided from the driving source 55. Thus, the beam deflection unit 56 deflects and scans an incident beam.

The beam deflection unit 56 may be implemented as polygonal mirror 57 having a plurality of reflecting surfaces 57a on its sides. The polygonal mirror 57 is rotated so that the reflecting surfaces 57a deflect and scan an incident beam. Since the polygonal mirror 57 has a polygonal structure, during high-speed rotation, a strong eddy is formed at a border between the reflecting surfaces 57a. The strong eddy causes noise and vibration.

The beam deflection unit 56 is not restricted to the aforementioned polygonal mirror 57 having the above-described structure, and other suitable arrangements and constructions may be used, such as a holographic disk (not shown) which deflects and scans a beam by diffracting the beam according to a hologram pattern. Herein, an air flow occurs within the cover member 60 due to the rotation of the holographic disk, thereby inducing noise and vibration.

The cover member 60 is arranged on the base 51 to cover the driving source 55 and the beam deflection unit 56. The cover member also blocks noise and vibration occurring when the driving source 55 and the beam deflection unit 56 rotate. The cover member 60 has a beam passage 60a through which an incident beam and a deflected scanning beam pass through. The beam passage 60a, shown in FIG. 3, is an opening, but, may have a transparent element (not shown) for transmitting a beam.

Figure 5:
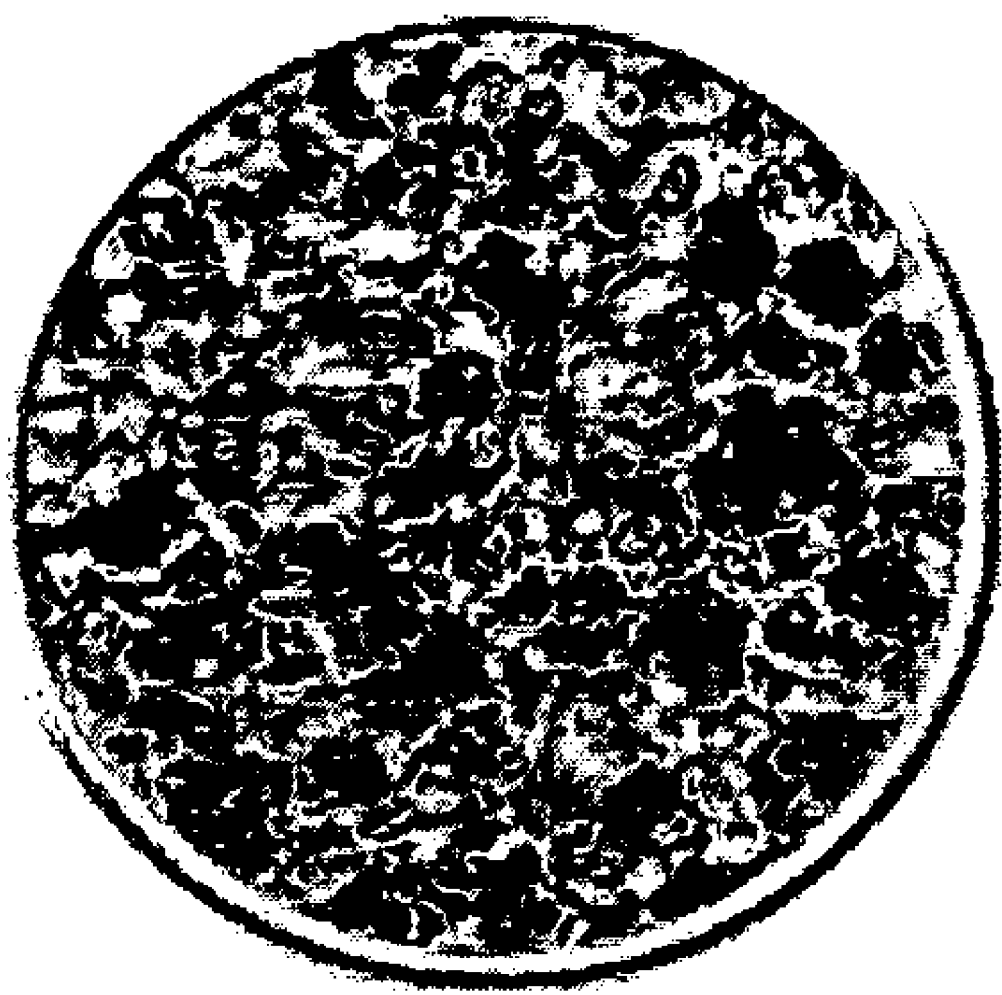
FIG. 5 is a diagram of a surface shape of aluminum foam shown in FIGS. 3 and 4.

The cover member 60 preferably has a an aluminum foam layer 61 to block noise and vibration generated by the driving source 55 and the beam deflection unit 56. The aluminum foam layer 61 is preferably made using an aluminum material and has a ventilating porous structure with a surface shape shown in FIG. 5. When a sound wave contacts the aluminum foam layer 61, the aluminium foam layer 61 changes the sound wave into heat energy due to the friction with barriers defining a cell structure of the aluminum foam layer 61. Accordingly, the aluminum foam layer 61 absorbs noise and vibration due to its porous structure. In addition, since aluminum has high heat conductivity, the aluminum foam layer 61 is highly efficient in discharging internal heat of the cover member 60 to the outside of the laser scanning unit 100. Accordingly, without a separate heat sink structure, heat induced by the high-speed rotation of the beam deflection unit 56 can be discharged efficiently.

When the cover member 60 is arranged close to the polygonal mirror 57, it absorbs an eddy induced during the rotation of the polygonal mirror 57 and converts the absorbed eddy into heat to prevent noise. In addition, the aluminum foam layer 61 has high heat conductivity and a wide surface area for contacting the air due to the cell structure defined by pores formed therein. Consequently, the aluminium foam layer 61 absorbs heat generated in the polygonal mirror 57 through convection and discharges the heat through internal conduction and an external convection current. Accordingly, unlike the conventional structure, a separate heat sink structure, such as a radiating pin, is not needed. Furthermore, since the aluminum foam layer 61 is very light, for example, it weighs 1/10 of normal aluminum or 1/30 of iron in the same size, the weight of a light scanning unit using the beam deflector 50 can be reduced.

Figure 4:
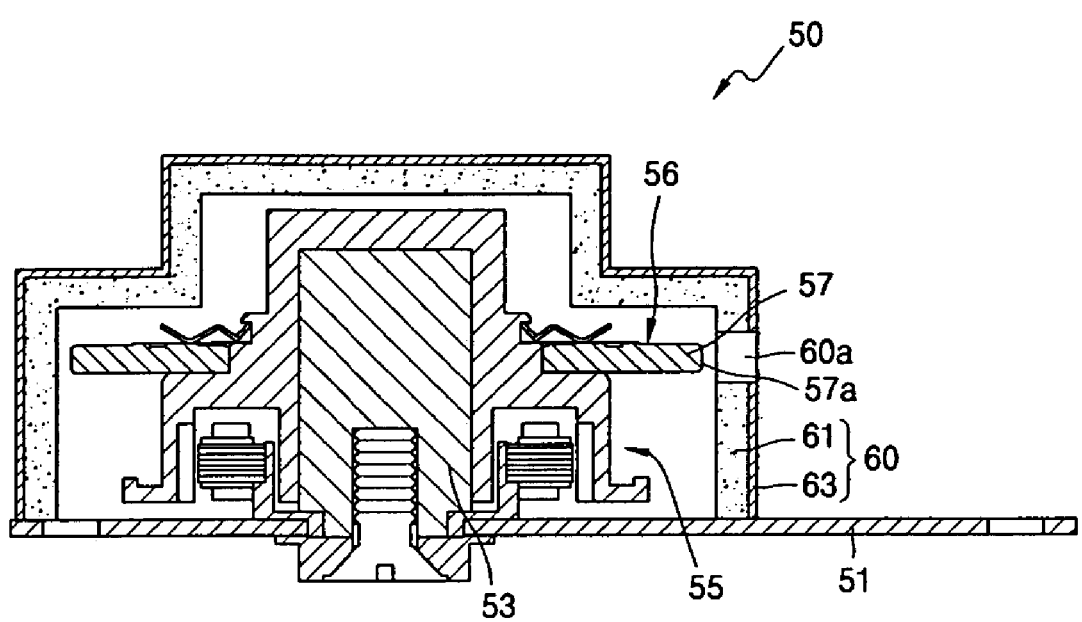
FIG. 4 is a sectional view of a beam deflector in accordance with another embodiment of the present invention.

Referring to FIG. 4, a beam deflector 50 according to another embodiment of the present invention includes a driving source 55 arranged on a base 51, a beam deflection unit 56 deflecting an incident beam, and a cover member 60 covering the driving source 55 and the beam deflection unit 56. Since the driving source 55 and the beam deflection unit 56 are substantially the same as those shown in FIG. 3, the descriptions thereof will be omitted here for clarity and conciseness.

The cover member 60 includes an aluminum foam layer 61 and a sound insulator 63 formed on an outside portion of the aluminum foam layer 61. Since the aluminum foam layer 61 is substantially the same as the aluminum foam layer 61 shown in FIG. 3, a detailed description thereof will also be omitted for clarity and conciseness. The cover member 60 has a beam passage 60a through which an incident beam and a deflected scanning beam pass through. The beam passage 60a, shown in FIG. 4, is an opening but may have a transparent element (not shown) for transmitting a beam.

The sound insulator 63 is made using a metal having a higher density than the aluminum foam 61. When the sound insulator 63 is provided, even noise escaping out through the aluminum foam 61 can be blocked. Therefore, the noise insulating effect can be relatively more effective. In addition, since the flexural rigidity of the cover member 60 can be increased due to the sound insulator 63, the cover member 60 and the beam deflector 50 can be prevented from being damaged. Moreover, contaminant substances are not generated due to the metallic characteristics of the sound insulator 63.

Here, the sound insulator 63 is formed on the outside of the aluminum foam layer 61; however, the sound insulator 63 may be formed on the inside of the aluminum foam layer 61 or both of the outside and the inside thereof.

Figure 6:
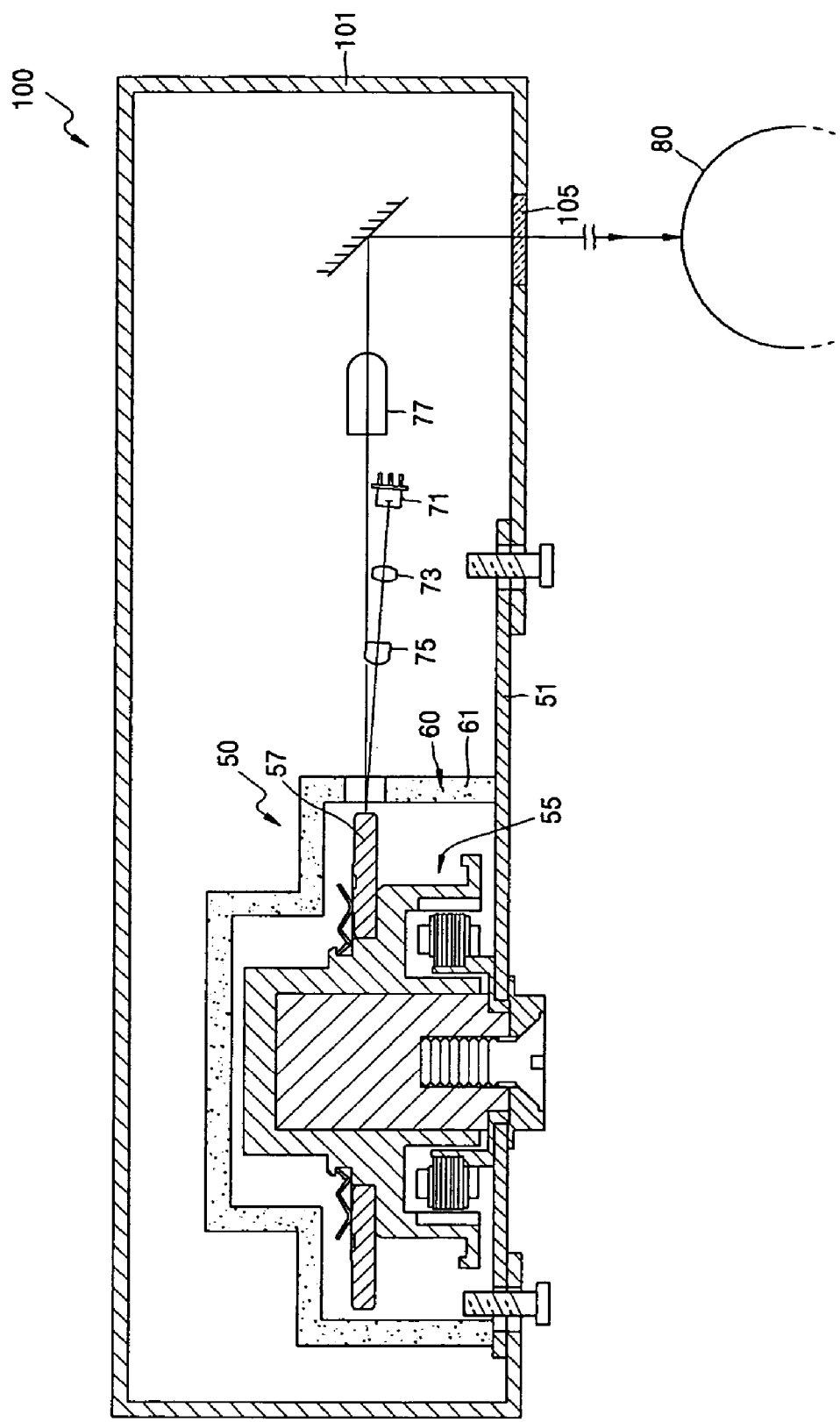
FIG. 6 is a schematic sectional view of a light scanning unit in accordance with an embodiment of the present invention.

Referring to FIG. 6, a light scanning unit 100 according to an embodiment of the present invention includes a light source 71, a beam deflector 50 deflecting an incident beam so that a beam emitted from the light source 71 is scanned onto a photoreceptor 80, and an f-θ lens 77. The light source 71, the beam deflector 50, and the f-θ lens 77 are received in a housing 101, thereby forming a single unit. Here, a window 105 is provided on a portion of the housing 101 to transmit a scanning beam having passed through the f-θ lens 77 with protection of the inside of the housing 101.

The light source 71 emits a beam having a predetermined wavelength and may be implemented as a semiconductor laser.

The beam deflector 50 includes a driving source 55, a polygonal mirror 57 as a beam deflection unit deflecting an incident beam, and a cover member 60 covering the driving source 55 and the polygonal mirror 57. The cover member 60 preferably includes an aluminum foam layer 61 to block noise and vibration generated by the driving source 55 and the polygonal mirror 57. Here, the beam deflector 50 has the same structure and operating effects as the beam deflectors described with reference to FIGS. 3–5. Thus, detailed descriptions thereof will be omitted for clarity and conciseness.

The f-θ lens 77 is installed between the beam deflector 50 and the photoreceptor 80. The f-θ lens 77 compensates for a beam deflected by the beam deflector 50 at different magnifications in a main scanning direction and a sub-scanning direction, respectively, and forms an image on an exposed surface of the photoreceptor 80. Here, the sub-scanning direction is the rotating direction of the photoreceptor 80, and the main scanning direction is the axial direction of the photoreceptor 80, which is a direction in which a beam is deflected by the polygonal mirror 57.

The light scanning unit 100 may further include a collimating lens 73 and at least one cylindrical lens 75 on an optical path between the light source 71 and the beam deflector 50. The collimating lens 73 converts a diverging beam emitted from the light source 71 into a parallel or converging beam. The cylindrical lens 75 collects an incident beam to the polygonal mirror 57 differently between the main scanning direction and the sub-scanning direction.

Since the light scanning unit 100 uses the beam deflector 50 including the cover member 60 comprised of an aluminum foam layer 61, noise and vibrations occurring when the polygonal mirror 57 rotates can be effectively reduced. Moreover, heat also can be effectively discharged without a separate heat sink structure.

Figure 7:
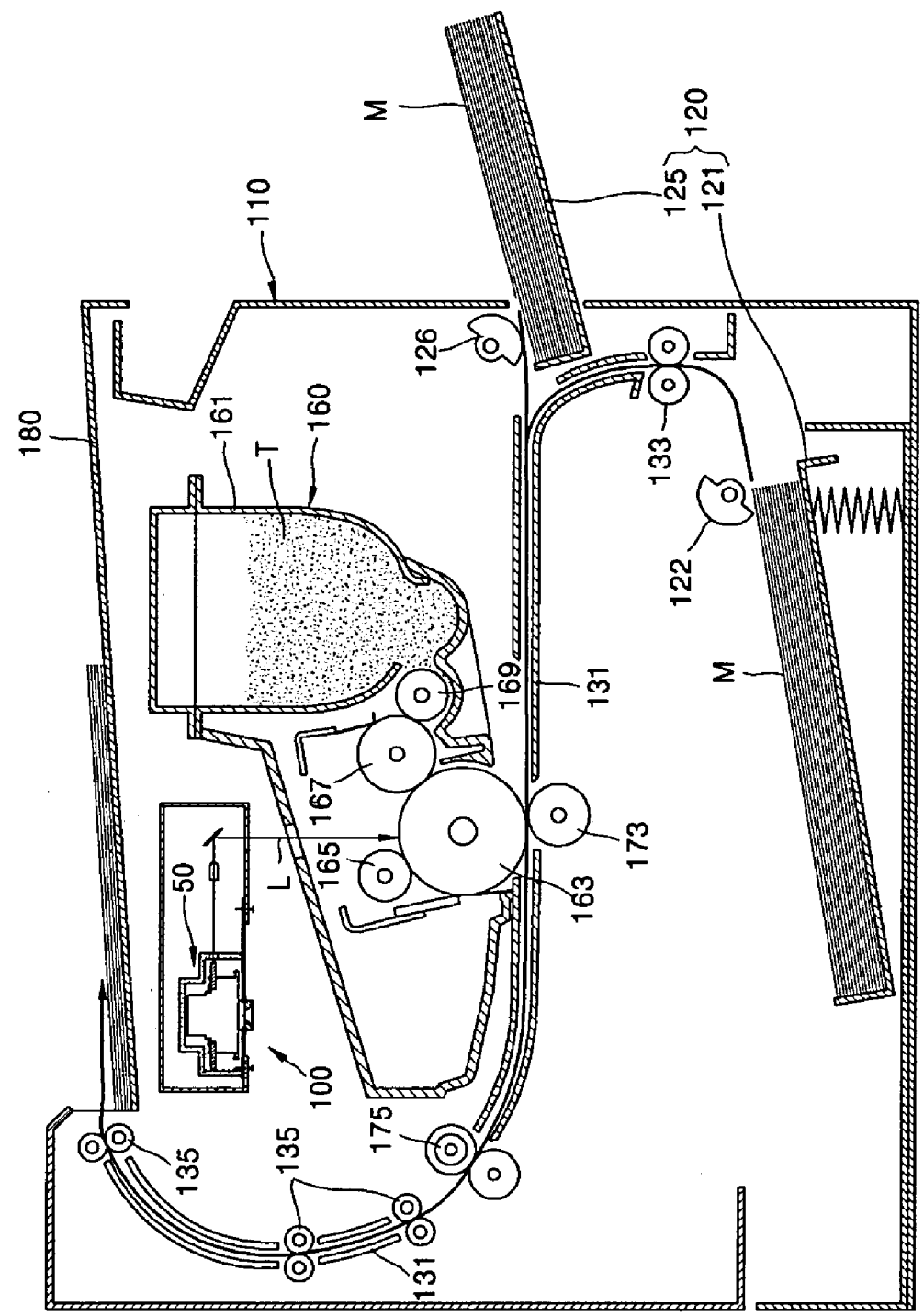
FIG. 7 is a schematic sectional view of an image forming apparatus in accordance with an embodiment of the present invention.

Referring to FIG. 7, an image forming apparatus according to an embodiment of the present invention includes a cabinet 110, a developing unit 160 installed within the cabinet 110, a light scanning unit 100 forming an electrostatic latent image, a transfer unit 173 transferring an image formed at the developing unit 160 to a printing medium, and a fusing unit 175 fusing an image onto the printing medium.

The cabinet 110 forms the shell of the image forming apparatus. A discharge unit 180 is provided outside the cabinet 110 so that discharged printing media M can be stacked thereon. In addition, a feed unit 120, in which the printing media M to be fed are stacked, is removably provided on the cabinet 110. A printing medium M fed by the feed unit 120 is delivered to the developing unit 160 through a delivery path 131.

The feed unit 120 includes a first feed portion 121, used for automatic feed of the printing media M, and a second feed portion 125, used for manual feed of the printing media M. The first feed portion 121 is provided within the cabinet 110. The first feed portion 121 feeds a printing medium M using the rotation of a first feeding roller 122. The second feed portion 125 is arranged outside the cabinet 110 and feeds a printing medium M to the delivery path 131 using the rotation of a second feeding roller 126.

The delivery path 131 is provided within the cabinet 110 to deliver the printing medium fed by the feed unit 120 and includes a plurality of delivery rollers 133 and 135. The delivery path 131 has two paths to receive the printing media M from the first and second feed portions 121 and 125, respectively, but, has a single path for image forming and a single path for discharging of the printing media M.

The developing unit 160 includes a toner container 161, containing toner T having a predetermined color, and an image forming portion, forming an image with the toner T supplied from the toner container 161.

The image forming portion includes a photoreceptor 163 responding to a beam L emitted from the light scanning unit 100, a charger 165 charging the photoreceptor 163 to a predetermined potential, a developing roller 167 disposed to face the photoreceptor 163 to develop the toner T to an area of an electrostatic latent image formed on the photoreceptor 163, and a supply roller 169 to supply the toner T to the developing roller 167.

The light scanning unit 100 scans a beam onto the photoreceptor 163 to form the electrostatic latent image on the photoreceptor 163. The light scanning unit 100 includes a light source (71 shown in FIG. 6), a beam deflector 50, and an f-θ lens (77 shown in FIG. 6) and has the same structure as the light scanning unit 100 shown in FIG. 6. Thus, a detailed description thereof will be omitted for clarity and conciseness.

The transfer unit 173 is disposed to face the photoreceptor 163 so that a printing medium M delivered along the delivery path passes therebetween and transfers an image formed on the photoreceptor 163 to the printing medium M.

The image transferred to the printing medium M is fused by the fusing unit 175.

As described above, a beam deflector in accordance with exemplary embodiments of the present invention includes a cover member preferably having an aluminum foam layer to effectively reduce noise and vibration occurring within the beam deflector. In addition, since heat generated within the beam deflector is absorbed through convection and is discharged through internal conduction and an external convection current, a separate heat sink structure such as a conventional radiating pin is not needed. Moreover, since the aluminum foam layer is very light as mentioned above, the weight of a light scanning unit including a cover member made using normal aluminum can be reduced. Furthermore, when a sound insulator is further provided on at least one side of the aluminum foam layer, noise insulating effects are improved. In addition, since the flexural rigidity of the cover member is increased, the cover member and the beam deflector can be prevented from being damaged.

A light scanning unit and a image forming apparatus using the light scanning unit includes the above-described beam deflector including the cover member made using the aluminum foam layer. Accordingly, heat can be discharge efficiently without a separate heat sink structure and the entire structure can be minimized. In addition, since internal vibration and noise can be suppressed through both of noise insulation and acoustic absorption, the reliability of the light scanning unit and the image forming apparatus can be increased.

While the present invention has been particularly shown and described with reference to exemplary embodiments thereof, it will be understood by those of ordinary skill in the art that various changes in form and details may be made therein without departing from the spirit and scope of the exemplary embodiments of the present invention as defined by the appended claims.

What is claimed is:

1. A beam deflector comprising:
a driving source providing a rotation force;
a beam deflection unit rotatably arranged on the driving source to deflect and scan an incident beam; and
a cover member configured to cover the driving source and the beam deflection unit, the cover member having an aluminum foam layer located thereon to reduce vibration and noise occurring when the driving source and the beam deflection unit rotate;
wherein a sound wave from the driving source and the beam deflection unit contacts the aluminum foam layer, the aluminum foam layer changes the sound wave into heat energy due to the friction with barriers defining a cell structure of the aluminum foam layer.

2. The beam deflector of claim 1, wherein the beam deflection unit is a polygonal mirror having a plurality of reflecting surfaces.

3. The beam deflector of claim 2, wherein the cover member further comprises a sound insulator arranged on at least one of an outside or an inside of the aluminum foam layer, the sound insulator being substantially made from a metal having a higher density than the aluminum foam layer.

4. The beam deflector of claim 1, wherein the cover member further comprises a sound insulator arranged on at least one of an outside or an inside of the aluminum foam layer, the sound insulator being substantially made from a metal having a higher density than the aluminum foam layer.

5. A light scanning unit comprising:
a light source;
a beam deflector to deflect and scan a beam emitted from the light source, the beam deflector having a driving source providing a torque, a beam deflection unit rotatably arranged on the driving source to deflect and scan an incident beam, and a cover member configured to cover the driving source and the beam deflection unit, the cover member including an aluminum foam layer; and
an f-θ lens compensating for a beam deflected by the beam deflector at different magnifications in a main scanning direction and a sub-scanning direction, respectively, and forming an image on a photoreceptor;
wherein a sound wave from the driving source and the beam deflection unit contacts the aluminum foam layer, the aluminum foam layer changes the sound wave into heat energy due to the friction with barriers defining a cell structure of the aluminum foam layer.

6. The light scanning unit of claim 5, wherein the beam deflection unit is a polygonal mirror having a plurality of reflecting surfaces.

7. The light scanning unit of claim 6, wherein the cover member further comprises a sound insulator arranged on at least one of an outside or an inside of the aluminum foam layer, the sound insulator being substantially made from a metal having a higher density than the aluminum foam layer.

8. The light scanning unit of claim 5, wherein the cover member further comprises a sound insulator arranged on at least one of an outside or an inside of the aluminum foam layer, the sound insulator being substantially made from a metal having a higher density than the aluminum foam layer.

9. An image forming apparatus comprising:
a developing unit including a photoreceptor;
a light source;
a beam deflector to deflect and scan a beam emitted from the light source, the beam deflector having a driving source providing a torque, a beam deflection unit rotatably arranged on the driving source to deflect and scan an incident beam, and a cover member configured to cover the driving source and the beam deflection unit, the cover member including an aluminum foam layer;
an f-θ lens compensating for a beam deflected by the beam deflector at different magnifications in a main scanning direction and a sub-scanning direction, respectively, and forming an image on the photoreceptor;
a transfer unit positioned so that the image formed on the developing unit can be transferred to a printing medium; and
a fusing unit to fuse the image transferred onto the printing medium;
wherein a sound wave from the driving source and the beam deflection unit contacts the aluminum foam layer, the aluminum foam layer changes the sound wave into heat energy due to the friction with barriers defining a cell structure of the aluminum foam layer.

10. The image forming apparatus of claim 9, wherein the beam deflection unit is a polygonal mirror having a plurality of reflecting surfaces.

11. The image forming apparatus of claim 10, wherein the cover member further comprises a sound insulator arranged on at least one of an outside or an inside of the aluminum foam layer, the sound insulator being substantially made from a metal having a higher density than the aluminum foam layer.

12. The image forming apparatus of claim 9, wherein the cover member further comprises a sound insulator arranged on at least one of an outside or an inside of the aluminum foam layer, the sound insulator being substantially made from a metal having a higher density than the aluminum foam layer.

* * * * *